US008922541B2

(12) United States Patent
Ono

(10) Patent No.: US 8,922,541 B2
(45) Date of Patent: Dec. 30, 2014

(54) METHOD OF DRIVING DISPLAY DEVICE

(75) Inventor: Shinya Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 151 days.

(21) Appl. No.: 13/821,578

(22) PCT Filed: Nov. 24, 2011

(86) PCT No.: PCT/JP2011/006542
§ 371 (c)(1),
(2), (4) Date: Mar. 8, 2013

(87) PCT Pub. No.: WO2013/076771
PCT Pub. Date: May 30, 2013

(65) Prior Publication Data

US 2013/0229405 A1 Sep. 5, 2013

(51) Int. Cl.

| | |
|---|---|
| ***G06F 3/038*** | (2013.01) |
| ***G09G 3/36*** | (2006.01) |
| ***G09G 3/20*** | (2006.01) |
| ***G09G 3/30*** | (2006.01) |

(52) U.S. Cl.
CPC ................ *G09G 3/3696* (2013.01); *G09G 3/20* (2013.01); *G09G 3/30* (2013.01)
USPC ............. 345/211; 345/212; 345/76; 345/102; 345/204; 345/690; 315/169.1; 315/169.3

(58) Field of Classification Search
USPC ........... 345/76, 102, 211, 204, 212, 427, 531, 345/690; 315/169.1, 169.3
See application file for complete search history.

(56) References Cited

U.S. PATENT DOCUMENTS

| | | | | |
|---|---|---|---|---|
| 7,573,068 B2 | 8/2009 | Shimoda et al. | | |
| 7,871,837 B2 | 1/2011 | Shimoda et al. | | |
| 7,876,390 B2 | 1/2011 | Yang | | |
| 7,944,412 B2 | 5/2011 | Ikeda | | |
| 8,325,317 B2 | 12/2012 | Yang | | |
| 2003/0098861 A1 * | 5/2003 | Nakatsuka et al. | ........... | 345/212 |

(Continued)

FOREIGN PATENT DOCUMENTS

| | | |
|---|---|---|
| JP | 2006-053539 | 2/2006 |
| JP | 2006-119618 | 5/2006 |

(Continued)

OTHER PUBLICATIONS

International Search Report for International Application No. PCT/JP2011/006542, mailed Feb. 21, 2012.

*Primary Examiner* — Shaheda Abdin
(74) *Attorney, Agent, or Firm* — Greenblum & Bernstein, P.L.C.

(57) ABSTRACT

A method of driving a display device including pixels in a matrix and a power source, each pixel including a light-emitting element, drive transistor, capacitance element, and switching transistor, and connected to the power source by a power line, the method including: setting a voltage across the light-emitting element smaller than or equal to its threshold voltage by adjusting a voltage outputted by the power source to the power line; (a) applying, to a gate of the drive transistor, a reset voltage with which the gate-source voltage of the drive transistor becomes larger than its threshold voltage; (c) causing a data voltage to be held in the capacitive element; and (d) causing the light-emitting element to emit light according to the data voltage by setting the voltage across the light-emitting element larger than its threshold voltage by adjusting the voltage outputted by the power source to the power line.

4 Claims, 10 Drawing Sheets

(56) References Cited

U.S. PATENT DOCUMENTS

| | | | | |
|---|---|---|---|---|
| 2003/0184539 | A1* | 10/2003 | Onozawa et al. | 345/212 |
| 2004/0257359 | A1* | 12/2004 | Muroi et al. | 345/212 |
| 2006/0012549 | A1 | 1/2006 | Ikeda | |
| 2006/0098521 | A1 | 5/2006 | Shimoda et al. | |
| 2007/0263132 | A1 | 11/2007 | Yang | |
| 2008/0106535 | A1* | 5/2008 | Kim et al. | 345/205 |
| 2009/0040164 | A1* | 2/2009 | Yamashita | 345/98 |
| 2009/0239321 | A1 | 9/2009 | Shimoda et al. | |
| 2011/0092008 | A1 | 4/2011 | Yang | |
| 2011/0205220 | A1 | 8/2011 | Ota | |

FOREIGN PATENT DOCUMENTS

| | | |
|---|---|---|
| JP | 2007-304554 | 11/2007 |
| JP | 2010-015187 | 1/2010 |
| JP | 2010-250111 | 11/2010 |
| JP | 2010-281872 | 12/2010 |
| JP | 2011-170181 | 9/2011 |

* cited by examiner

METHOD OF DRIVING DISPLAY DEVICE

TECHNICAL FIELD

The present invention relates to methods of driving a display device, and particularly to a method of driving a display device that uses organic electroluminescence (EL) elements.

BACKGROUND ART

Recent years have seen progress in the development and practical implementation of display devices (hereafter referred to as organic EL display devices) using organic EL elements. Generally, an organic EL display device includes (i) a display unit having, arranged in a matrix, pixel circuits each having an organic EL element, and (ii) a control circuit for controlling the display unit.

With regard to the pixel circuit used in organic EL display devices known as an active-matrix type, there is proposed a driving method and a circuit configuration made up of a small number of circuit components and having various functions for making organic EL elements emit light more precisely and stably (for example, Patent Literature (PTL) 1).

FIG. 8 is a circuit diagram showing a conventional pixel circuit 90 disclosed in PTL 1. The pixel circuit 90 includes a drive transistor TD, switching transistors T1 and T2, a capacitive element Cs, and an organic EL element EL.

In the pixel circuit 90, a control circuit not shown in the figure supplies: selection signals Vsea and Vseb, via selection lines Lsea and Lseb; a detecting voltage Vmeas and a gray scale voltage Vdata, via a data line Ld; and a power source voltage via a power source line La and a common electrode Ec.

According to the pixel circuit 90, first, the threshold voltage of the drive transistor TD which changes over time is identified by measuring the current flowing in the drive transistor TD according to the application of the detecting voltage Vmeas, and the identified threshold voltage is stored in the control circuit not shown in the figure. Then, by causing the organic EL element EL to emit light using the gray scale voltage Vdata that has been corrected based on the stored threshold voltage, it is possible to cause light emission at a precise and stable luminance regardless of the change over time of the threshold voltage of the drive transistor TD.

CITATION LIST

Patent Literature

[PTL 1] Japanese Unexamined Patent Application Publication No. 2010-281872

SUMMARY OF INVENTION

Technical Problem

However, although it is possible to correct the change over time of the threshold voltage of the drive transistor and cause the organic EL element EL to emit light at a precise and stable luminance in the conventional technique, no consideration has been made for countermeasures to reduce drive transistor threshold voltage fluctuation in which the 1-frame luminance fluctuation is at a visible level.

The present invention is conceived in view of the aforementioned problem and has as an object to provide a method of driving a display device in which it is possible to reduce the change over time of the threshold voltage of the drive transistor in a pixel circuit made up of a small number of circuit components.

Solution to Problem

In order to achieve the aforementioned object, a driving method according to an aspect of the present invention is a method of driving a display device, the display device including: pixel circuits arranged in a matrix; and a power source circuit, each of the pixel circuits including: a light-emitting element having a first electrode and a second electrode, the second electrode being connected to a second power source line; a drive transistor having one of a source electrode and a drain electrode connected to a first power source line, and the other of the source electrode and the drain electrode connected to the first electrode of the light-emitting element; a capacitive element connected to a gate electrode of the driving transistor, for holding a data voltage; and a switching transistor that switches between conduction and non-conduction between the capacitive element and a data line, the power source circuit outputting a voltage to the first power source line and the second power source line, and the method including: a step of simultaneously setting a voltage between both of the electrodes of the light-emitting element of each of the pixel circuits to be smaller than or equal to a threshold voltage of the light-emitting element, by adjusting a voltage outputted by the power source circuit to the first power source line or the second power source line; a resetting step of simultaneously applying a reset voltage to the gate electrode of the drive transistor of each of the pixel circuits to control fluctuation of a threshold voltage of the drive transistor, the reset voltage being a voltage with which a gate electrode-source electrode voltage of the drive transistor becomes a voltage larger than the threshold voltage of the drive transistor; a step of causing the data voltage to be held in the capacitive element, sequentially on a row-by-row basis, the rows being included in the matrix; and a step of simultaneously causing the light-emitting element of each of the pixel circuits to emit light according to the data voltage, by setting the voltage between both of the electrodes of the light-emitting element to be larger than the threshold voltage of the light-emitting element by adjusting the voltage outputted by the power source circuit to the first power source line or the second power source line.

Advantageous Effects of Invention

According to the method of driving a display device according to the present invention, the fluctuation of the threshold voltage Vth of the drive transistor is suppressed by way of the drive transistor turning ON according to the application of the reset voltage, and thus the error in the amount of current supplied from the drive transistor to the light-emitting element caused by the fluctuation of the threshold voltage of the drive transistor is reduced. As a result, current in an amount that more precisely corresponds to the data voltage is supplied from the drive transistor to the light-emitting element, and thus it is possible to cause the light-emitting element to emit light at a more precise and stable luminance.

DESCRIPTION OF EMBODIMENTS

Figure 1:
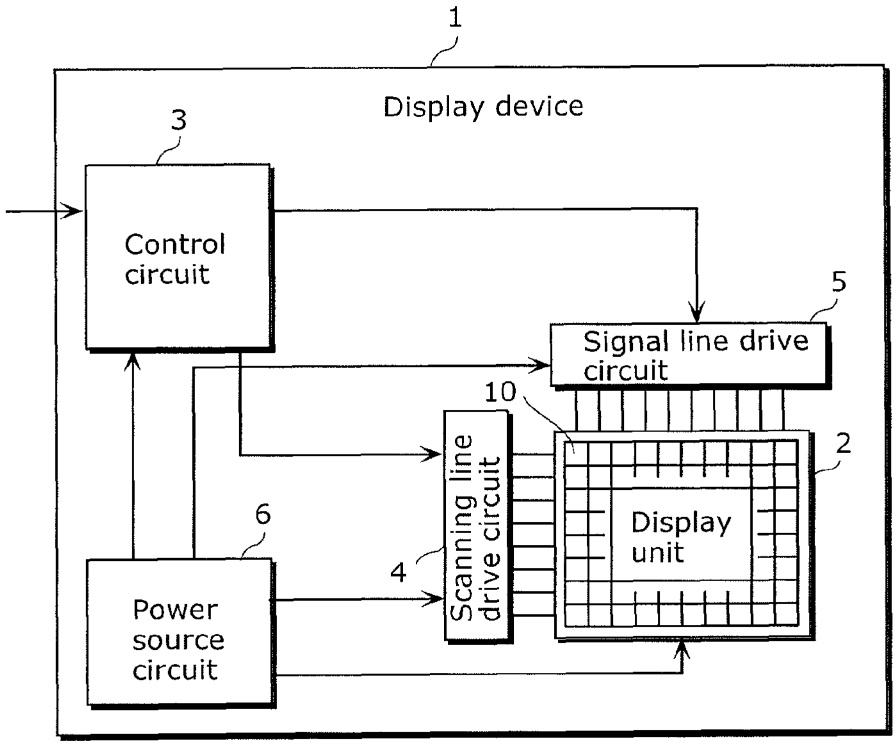
FIG. 1 is a function block diagram showing an example of a configuration of a display device in an embodiment.

A driving method according to an aspect of the present invention is a method of driving a display device, the display device including: pixel circuits arranged in a matrix; and a power source circuit, each of the pixel circuits including: a light-emitting element having a first electrode and a second electrode, the second electrode being connected to a second power source line; a drive transistor having one of a source electrode and a drain electrode connected to a first power source line, and the other of the source electrode and the drain electrode connected to the first electrode of the light-emitting element; a capacitive element connected to a gate electrode of the driving transistor, for holding a data voltage; and a switching transistor that switches between conduction and non-conduction between the capacitive element and a data line, the power source circuit outputting a voltage to the first power source line and the second power source line, and the method including: a step of simultaneously setting a voltage between both of the electrodes of the light-emitting element of each of the pixel circuits to be smaller than or equal to a threshold voltage of the light-emitting element, by adjusting a voltage outputted by the power source circuit to the first power source line or the second power source line; a resetting step of simultaneously applying a reset voltage to the gate electrode of the drive transistor of each of the pixel circuits to control fluctuation of a threshold voltage of the drive transistor, the reset voltage being a voltage with which a gate electrode-source electrode voltage of the drive transistor becomes a voltage larger than the threshold voltage of the drive transistor; a step of causing the data voltage to be held in the capacitive element, sequentially on a row-by-row basis, the rows being included in the matrix; and a step of simultaneously causing the light-emitting element of each of the pixel circuits to emit light according to the data voltage, by setting the voltage between both of the electrodes of the light-emitting element to be larger than the threshold voltage of the light-emitting element by adjusting the voltage outputted by the power source circuit to the first power source line or the second power source line.

According to such a driving method, the fluctuation of the threshold voltage Vth of the drive transistor is suppressed by way of the drive transistor turning ON according to the application of the reset voltage, and thus the error in the amount of current supplied from the drive transistor to the light-emitting element caused by the fluctuation of the threshold voltage of the drive transistor is reduced. As a result, current in an amount that more precisely corresponds to the data voltage is supplied from the drive transistor to the light-emitting element, and thus it is possible to cause the light-emitting element to emit light at a more precise and stable luminance.

Furthermore, the driving method may further include a reset-stopping step of applying a voltage that is smaller than the threshold voltage of the drive transistor to the gate electrode of the drive transistor, after the resetting step and before the step of causing the data voltage to be held in the capacitive element.

According to such a driving method, the introduction of the reset-stopping step allows for the elimination of the difference in the effective resetting period when the time between the resetting step and the data writing step is different depending on the row.

Furthermore, the second electrode of the light-emitting element may be connected to the second power source line directly, without interposition of a circuit element, the one of the source electrode and the drain electrode of the drive transistor my be connected to the first power source line, without interposition of a circuit element, and the other of the source electrode and the drain electrode of the drive transistor may be connected to the first electrode of the light-emitting element, without interposition of a circuit element.

Furthermore, it is possible that each of the pixel circuits does not include any circuit element other than the light-emitting element, the drive transistor, the capacitive element, and the switching transistor.

Furthermore, the drive transistor may be of a back-channel-etched type or a channel protective film type.

According to a display device configured in the above manner, driving according to the above-described driving method allows the above-described advantageous effects to be obtained by using the simplest pixel circuit which includes only the light-emitting element, the drive transistor, the capacitive element, and the switching transistor.

Hereinafter, an embodiment of the present invention shall be described. It is to be noted that, in all the figures, the same reference signs are given to components that fulfill the same functions and redundant description thereof shall be omitted.

The driving method in the embodiment is a method of driving a display device including a display unit having plural pixel circuits arranged in a matrix, and includes a resetting step for reducing fluctuation of the threshold voltage of a drive transistor included in each of the pixel circuits.

Hereinafter, the embodiment of the present invention shall be described with reference to the Drawings.

FIG. 1 is a function block diagram showing an example of a display device 1 that is driven according to the driving method according to the embodiment.

The display device 1 includes a display unit 2, a control circuit 3, a scanning line drive circuit 4, a signal line drive circuit 5, and a power source circuit 6.

The display circuit 2 includes plural pixel circuits 10 that are arranged in a matrix. Each of rows in the matrix is provided with a scanning line connected in common to the pixel circuits 10 that are arranged in the same row, and each of the columns of the matrix is provided with a data signal line connected in common to the pixel circuits 10 that are arranged in the same column.

The control circuit 3 is a circuit that controls the operation of the display device 1, receives a video signal from an external source, and controls the scanning line drive circuit 4 and the signal line drive circuit 5 so that the image represented by the video signal is displayed by the display unit 2.

The scanning line drive circuit 4 supplies a control signal for controlling the operation of the pixel circuit 10, to the pixel circuit 10 via the scanning line.

The signal line drive circuit 5 supplies a data signal corresponding to the luminance, to the pixel circuit 10 via the data signal line.

The power source circuit 6 supplies the power source for the operation of the display device 1, to the respective parts of the display device 1.

Figure 2A:
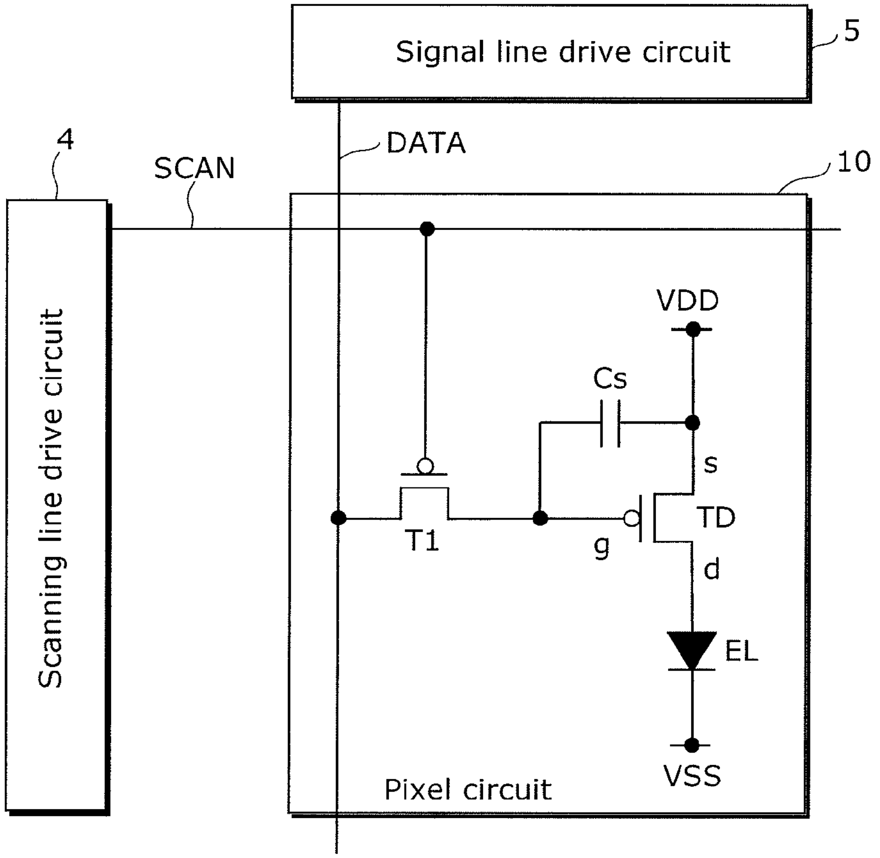
FIG. 2A is a circuit diagram showing an example of a configuration of a pixel circuit in the embodiment.

FIG. 2A is a circuit diagram showing an example of the configuration of a pixel circuit 10, and an example of the connections between the pixel circuit 10, the scanning line drive circuit 4, and the signal line drive circuit 5.

A signal line SCAN is provided, as a scanning signal line, in each of the rows of the display unit 2, and a signal line DATA is provided, as a data signal line, in each of the columns of the display unit 2.

Furthermore, the display unit 2 is provided with a power source line VDD for transmitting and distributing to the pixel circuit 10 the power source voltage outputted from a power source circuit 6 and a power source line VSS for transmitting and distributing to the pixel circuit 10 the power source voltage outputted from a power source circuit 6. The power source lines VDD and VSS are connected in common to all of the pixel circuits 10.

Each of the pixels 10 that are arranged in the display unit 2 is connected to the scanning line drive circuit 4 by the signal line SCAN of the row in which the pixel 10 is located, and connected to the signal line drive circuit 5 by the signal line DATA of the column in which the pixel 10 is located.

The signal line SCAN transmits a control signal for controlling the operation of the pixel circuit 10, from the scanning line drive circuit 4 to the pixel circuit 10 via a scanning line. The signal line DATA transmits a data signal corresponding to the luminance, from the signal line drive circuit 5 to the pixel circuit 10.

The pixel circuit 10 is a circuit that causes the organic EL element to emit light at a luminance corresponding to the data signal, and includes the drive transistor TD, the switching transistor T1, the capacitive element Cs, and the light-emitting element EL. Each of the transistor TD and the switching transistor T1 is configured of a P-type thin-film transistor (TFT), and the light-emitting element EL is configured of an organic EL element.

The drive transistor TD has a source electrode s that is connected to the power source line VDD.

The capacitive element Cs has a first electrode (at the left side of the illustration) that is connected to a gate electrode g of the drive transistor TD, and a second electrode (at the left side of the illustration) that is connected to the source electrode s of the drive transistor TD.

The switching transistor T1 switches between conduction and non-conduction between the gate electrode g of the driving transistor TD and the signal line DATA.

The light-emitting element EL has a first electrode (at the top side of the illustration) that is connected to a drain electrode d of the drive transistor TD, and a second electrode (at the bottom side of the illustration) that is connected to the power source line VSS.

It should be noted that the drive transistor TD and the switching transistor T1 may also be configured of N-type transistors.

Figure 2B:
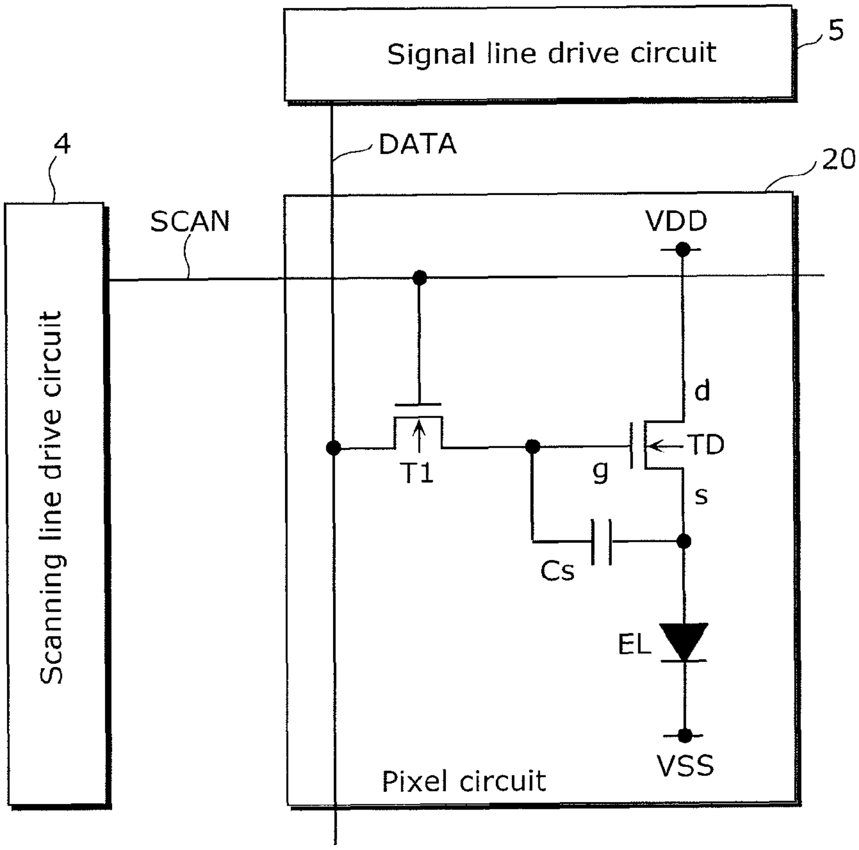
FIG. 2B is a circuit diagram showing another example of a configuration of a pixel circuit in the embodiment.

FIG. 2B is a circuit diagram showing an example of the configuration of a pixel circuit 20. Compared to the pixel circuit 10, the pixel circuit 20 is different in that the drive transistor TD and the switching circuit T1 are both configured of N-type TFTs, and that the first electrode (at the top side of the illustration) of the light-emitting element EL is connected to the source electrode s of the drive transistor TD.

Figure 3A:
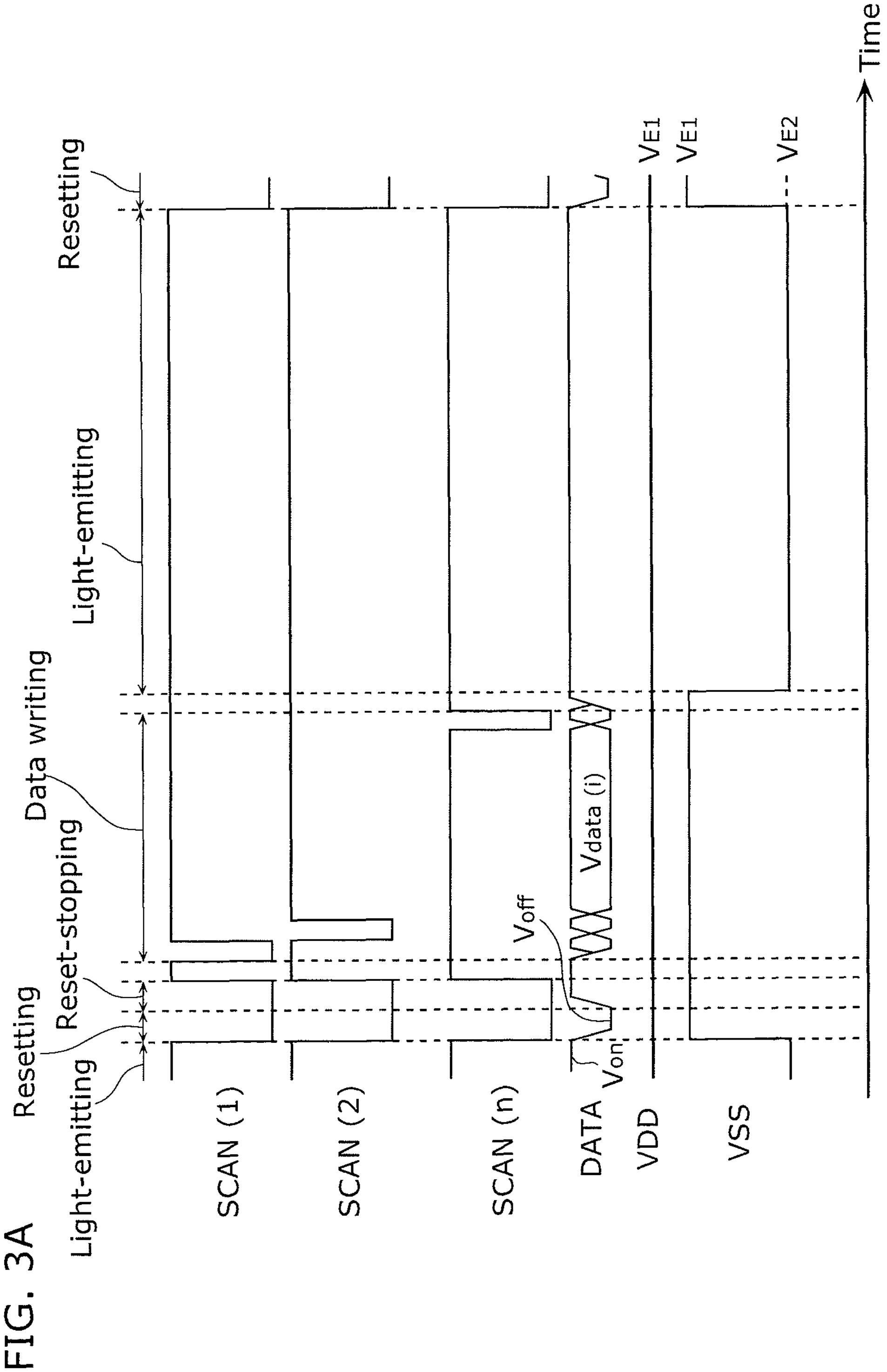
FIG. 3A is a timing chart showing an example of control signals, power source voltages, and data signals in the embodiment.

FIG. 3A is a timing chart showing an example of the control signals, power source voltages, and data signals for operating the pixel circuit 10, for one frame period. In FIG. 3A, the vertical axis denotes the level of each signal, and the horizontal axis represents the passing of time. To facilitate description, the control signals, the data voltages, and the power source voltages are given the same names as the respective signal lines and power source lines through which they are transmitted.

Since the switching transistor T1 of the pixel circuit 10 is configured of a P-type TFT, there is a conducting state between the source electrode and drain electrode of the switching transistor T1 in a period in which the control signal SCAN is at the LOW level, and there is a non-conducting state in a period in which the control signal SCAN is at the HIGH level.

Figure 3B:
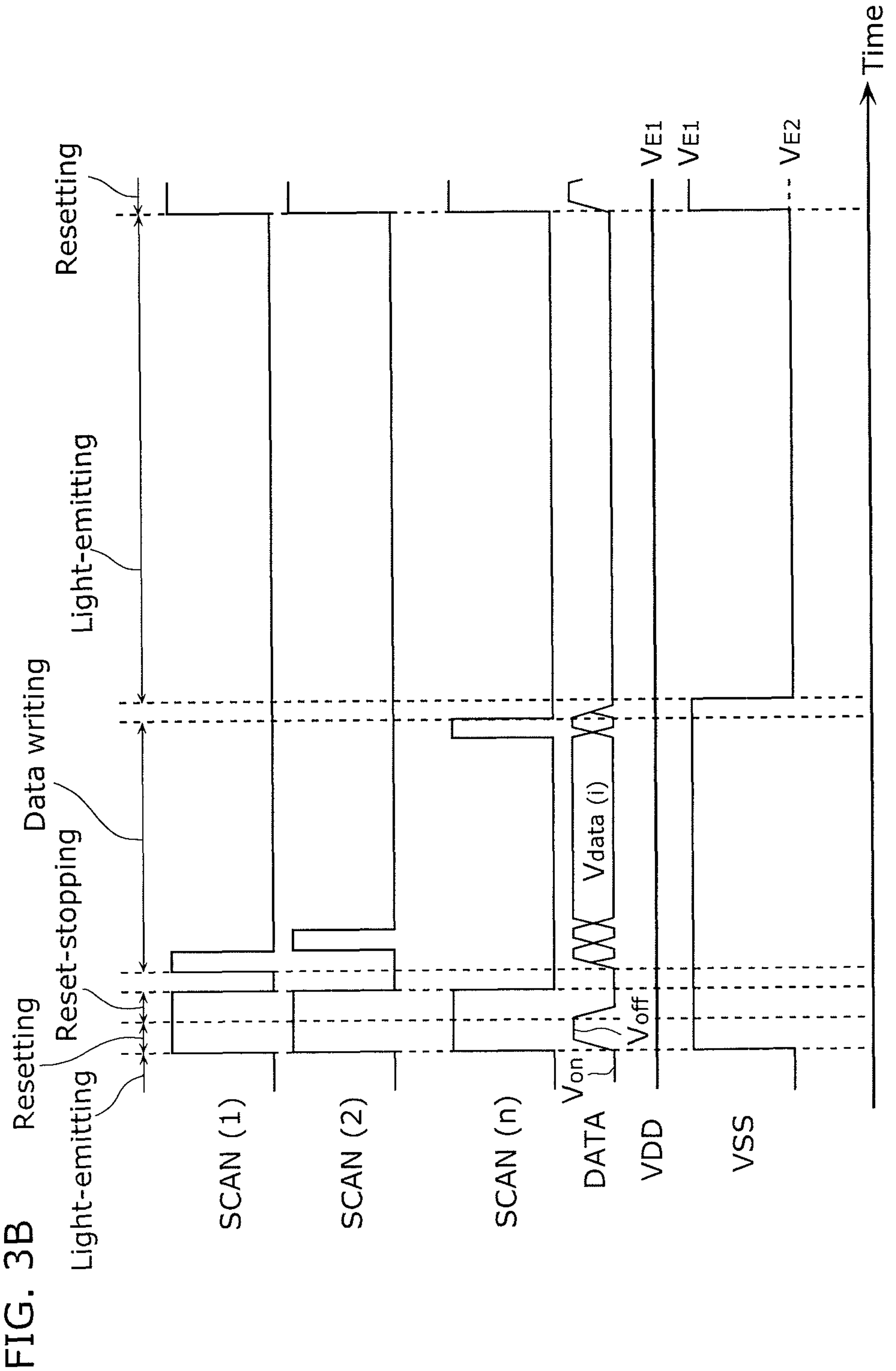
FIG. 3B is a timing chart showing another example of control signals, power source voltages, and data signals in the embodiment.

FIG. 3B is a timing chart showing an example of the control signals, power source voltages, and data signals for operating the pixel circuit 20, for one frame period. In FIG. 3B, the vertical axis denotes the level of each signal, and the horizontal axis represents the passing of time. To facilitate description, the control signals, the data voltages, and the power source voltages are given the same names as the respective signal lines and power source lines through which they are transmitted.

Since the switching transistor T1 of the pixel circuit 20 is configured of an N-type TFT, there is a conducting state between the source electrode and drain electrode of the switching transistor T1 in a period in which the control signal SCAN is at the HIGH level, and there is a non-conducting state in a period in which the control signal SCAN is at the LOW level. Specifically, the pixel circuit 20 performs the same operation as the pixel circuit 10 when provided with control signals and data signals having respective levels obtained by simply reversing the levels of the control signals and data signals used in the pixel circuit 10.

The pixel circuits 10 and 20 repeat a resetting step, a reset-stopping step, a data writing step, and a light-emitting step, on a frame basis, according to the control signals, power source voltages, and data signals shown in FIG. 3A and FIG. 3B respectively.

Figure 4:
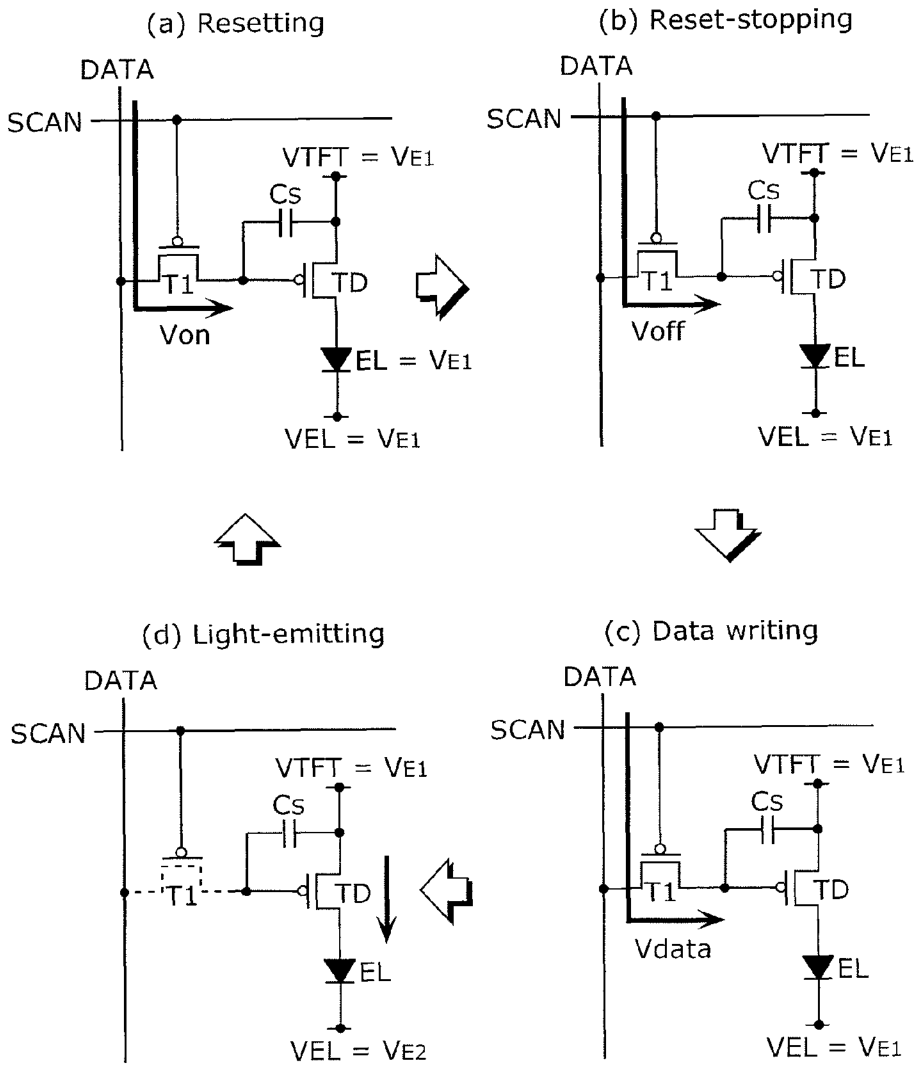
FIG. 4 is a circuit diagram showing an example of the operation of a pixel circuit in the embodiment.

In FIG. 4, (a) to (d) are circuit diagrams for describing the operation of the pixel circuit 10 in the resetting step, the reset-stopping step, the data writing step, and the light-emitting step, respectively.

First, the resetting step is executed simultaneously on all rows in a non-light-emitting period after the light-emitting step of the preceding frame and before the light-emitting step of the current frame.

In the resetting step, the power source circuit 6 outputs, to the power source lines VDD and VSS, a voltage with which the voltage between both electrodes of the light-emitting element EL becomes smaller than or equal to the threshold voltage of the light-emitting element EL. The power source circuit 6 may output a fixed voltage $V_{E1}$ to the power source line VDD while adjusting the voltage to be outputted to the power source line VSS to a voltage that is the same or larger than a voltage obtained by deducting the threshold voltage of the light-emitting element EL from the voltage $V_{E1}$. Accordingly, regardless of what voltage is applied to the gate electrode of the drive transistor TD, a voltage that is larger than the threshold voltage is not applied between both electrodes of the light-emitting element EL, and thus the light-emitting element EL does not emit light.

The signal line drive circuit 5 outputs, to the data line DATA, a voltage for resetting the drive transistor TD. For example, the signal line drive circuit 5 outputs a reset voltage Von with which the gate electrode-source electrode voltage becomes larger than the threshold voltage of the drive transistor TD.

The scanning line drive circuit 4 simultaneously outputs a LOW level control signal to the respective signal lines SCAN of all the rows.

With this, the reset voltage Von is simultaneously applied to the gate electrode G of the drive transistor TD of all the rows, via the switching transistor T1, and by way of the drive transistor TD turning ON, fluctuation of the threshold voltage Vth of the drive transistor TD is suppressed. The advantageous effect produced by the introduction of the resetting step shall be described later based on results of experimentation.

Furthermore, at this time, the power source voltages VDD and VSS are adjusted to a voltage with which the voltage between both electrodes of the light-emitting element EL is smaller than or equal to the threshold voltage of the light-emitting element EL, and thus the light-emitting element EL does not emit light, and deterioration of display contrast and increased power consumption due to unnecessary light emission by the light-emitting element EL can be suppressed.

Next, the reset-stopping step is simultaneously executed on all the rows.

In the reset-stopping step, the signal line drive circuit 5 outputs, to the data line DATA, a reset-stopping voltage Voff with which the gate electrode-source electrode voltage of the drive transistor TD becomes lower than or equal to the threshold voltage of the drive transistor TD.

With this, the reset voltage Voff is applied to the gate electrode g of the drive transistor TD, the drive transistor TD turns OFF, and the reset operation stops.

The reset-stopping step is a step for eliminating the difference in the effective resetting period when the time between the resetting step and the data writing step is different depending on the row. When display-related problems, for example, problems such as residual images, trailing during window scrolling, misadjusted black level, and uniformity during raster display are within an acceptable range of visibility as a result of the execution of the resetting step, the reset-stopping step may be omitted.

Next, the data writing step is executed for a different period per row.

As shown in (c) in FIG. 4, in the data writing step on an i-th row, the data voltage DATA is set to a voltage Vdata(i) corresponding to the luminance of a pixel circuit of the i-th row, and the control signal SCAN for the i-th row changes to the LOW level.

Accordingly, in the pixel circuit of the i-th row, the voltage Vdata(i) is held in the capacitive element Cs, via the switching transistor T1.

Subsequently, the light-emitting step is simultaneously executed on all the rows.

In the light-emitting step, the power source circuit 6 outputs, to the power source lines VDD and VSS, a voltage with which the voltage between both electrodes of the light-emitting element EL becomes larger than the threshold voltage of the light-emitting element EL. The power source circuit 6 may output a fixed voltage $V_{E1}$ to the power source line VDD while adjusting the voltage to output to the power source line VSS to a voltage (voltage $V_{E2}$ in the example shown) that is lower than a voltage obtained by deducting the threshold voltage of the light-emitting element EL from the voltage $V_{E1}$.

With this, the drive transistor TD supplies the light-emitting element EL with a current that is of a size that corresponds to the voltage Vdata held in the capacitive element Cs. The light-emitting element EL emits light at a luminance corresponding to the size of the current supplied from the drive transistor TD.

Figure 5A:
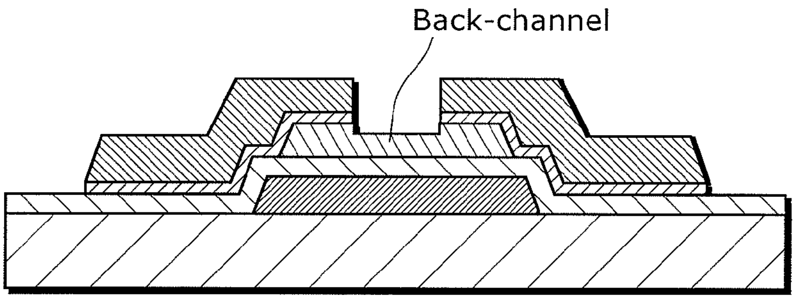
FIG. 5A is a cross-sectional view of an example of a preferable drive transistor structure for applying the driving method according to the present invention.
Figure 5B:
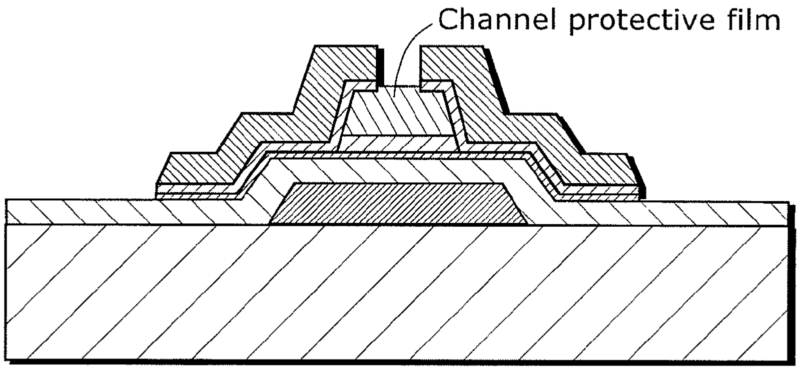
FIG. 5B is a cross-sectional view of another example of a preferable drive transistor structure for application of the driving method according to the present invention.

FIG. 5A and FIG. 5B are cross-sectional views of examples of preferable drive transistor structures for applying the above-described driving method. The above-described driving method can be optimally applied to a pixel circuit in which the drive transistor TD is configured of a back-channel-etched-type TFT shown in FIG. 5A or a channel protective film-type (channel etch-stopper-type) TFT shown in FIG. 5B.

According to the above-described driving method, the resetting step of turning ON the drive transistor TD using the reset voltage Von is executed on a per frame basis, and thus the fluctuation of the threshold voltage Vth of the drive transistor TD is suppressed, and the error in the amount of current supplied from the drive transistor to the light-emitting element in one frame caused by the fluctuation of the threshold voltage of the drive transistor is reduced.

As a result, current in an amount that more precisely corresponds to the data voltage is supplied from the drive transistor to the light-emitting element, and thus it is possible to cause the light-emitting element to emit light at a more precise and stable luminance.

Results of an experiment verifying the advantageous effects of the suppression of the fluctuation of the threshold voltage Vth of the drive transistor TD resulting from the introduction of the resetting step shall be described.

Figure 6A:
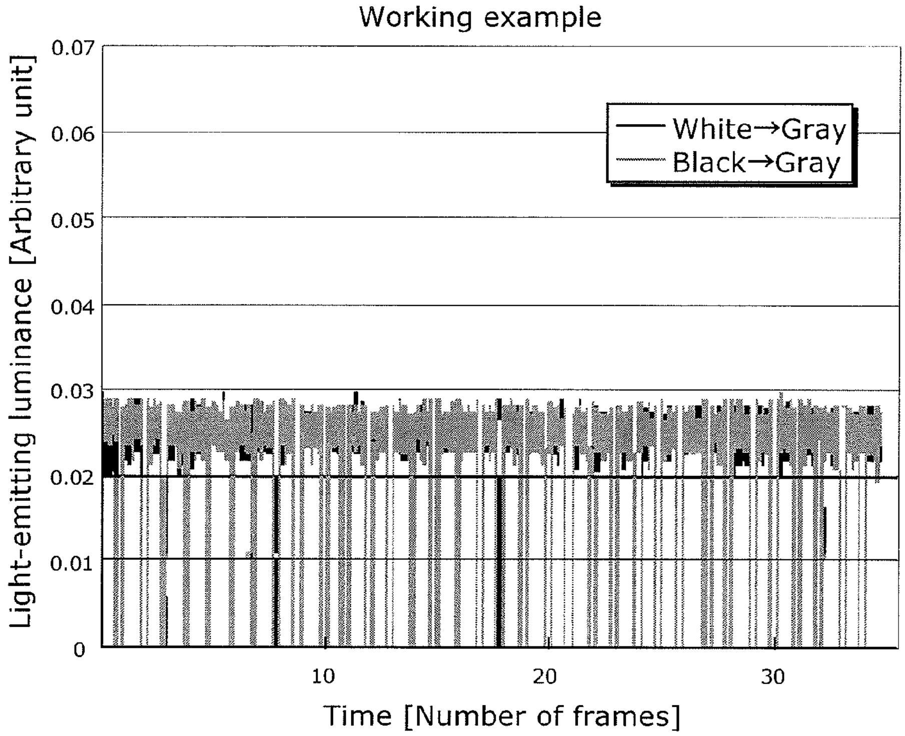
FIG. 6A is a graph showing moment-to-moment variation of light-emitting luminance of a pixel circuit in a working example.

FIG. 6A is a graph showing the moment-to-moment variation of light-emitting luminance in a working example in which the pixel circuit 10 is driven according to the driving method including the above-described resetting step, and shows the measurement results for light-emitting luminance for 35 frames immediately after switching from a white or black display to a gray display.

In the working example, although a slight difference in light-emitting luminance can be observed in the first frame following the switching to a gray display depending on whether the display in the preceding frame is white or black, approximately the same light-emitting luminance can be obtained from the second frame onward, and there is rapid convergence to the correct gray display. Furthermore, there is also almost no fluctuation in the light-emitting luminance within the respective frames.

Figure 6B:
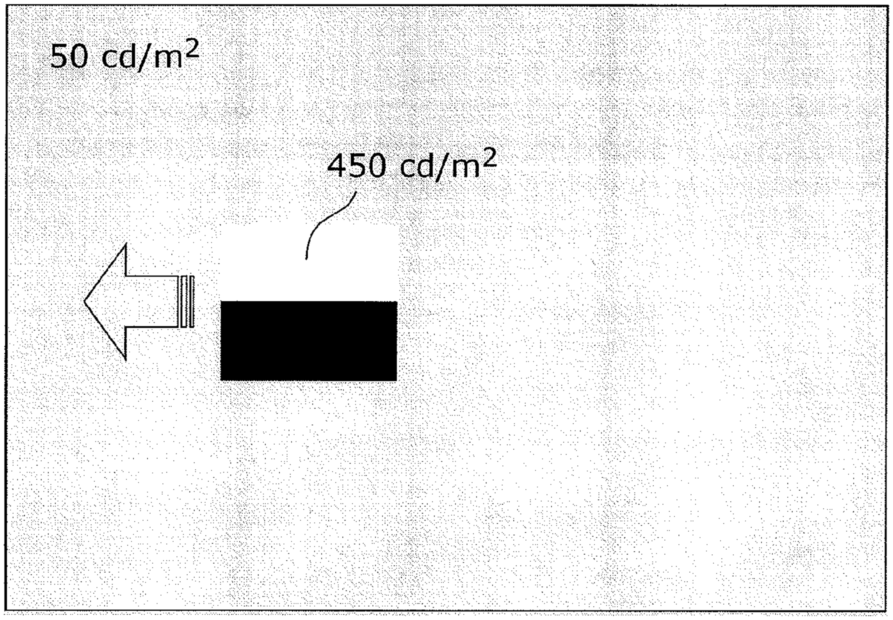
FIG. 6B shows an example of scrolling display by a display unit using the pixel circuit in the working example.

As a result, as shown in FIG. 6B for example, even when a black or white window is scrolled in an intermediate gray scale background color, a region that the window passes which once again turns to the background color settles down rapidly to the correct intermediate gray scale luminance, and thus the display deterioration referred to as trailing is not visible.

Figure 7A:
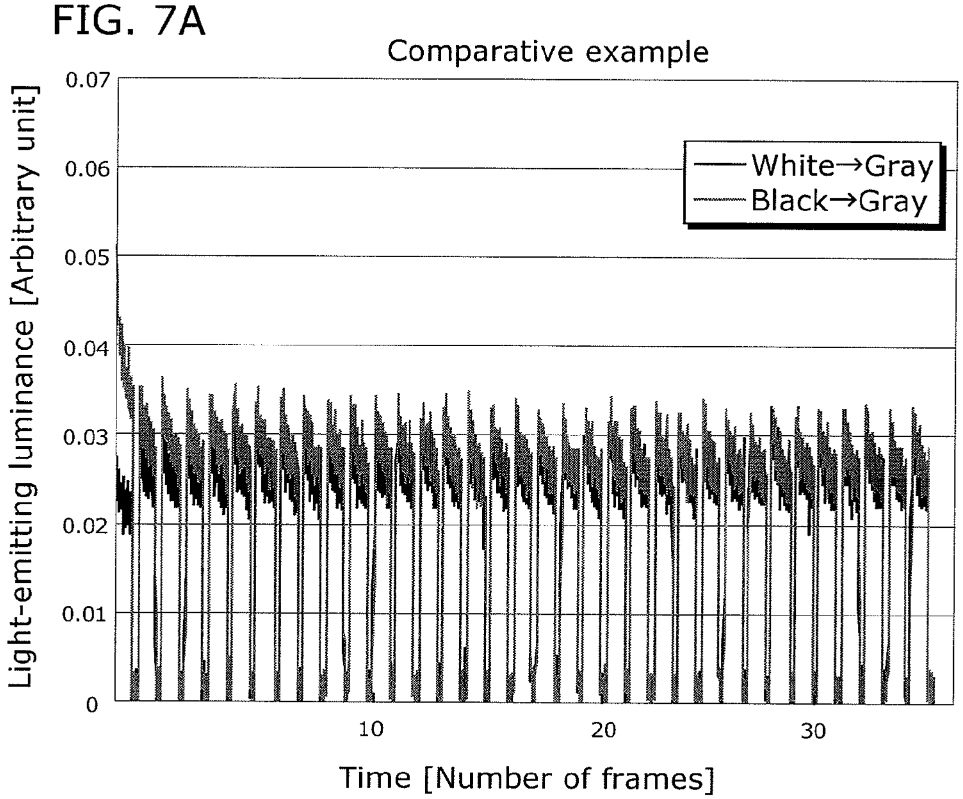
FIG. 7A is a graph showing moment-to-moment variation of light-emitting luminance of a pixel circuit in a comparative example.

In contrast, FIG. 7A is a graph showing the moment-to-moment variation of light emission luminance in a comparative example in which the pixel circuit 10 is driven according to a driving method in which the resetting step is omitted, and shows the measurement results for light emission luminance for 35 frames immediately after switching from a white or black display to a gray display.

Figure 7B:
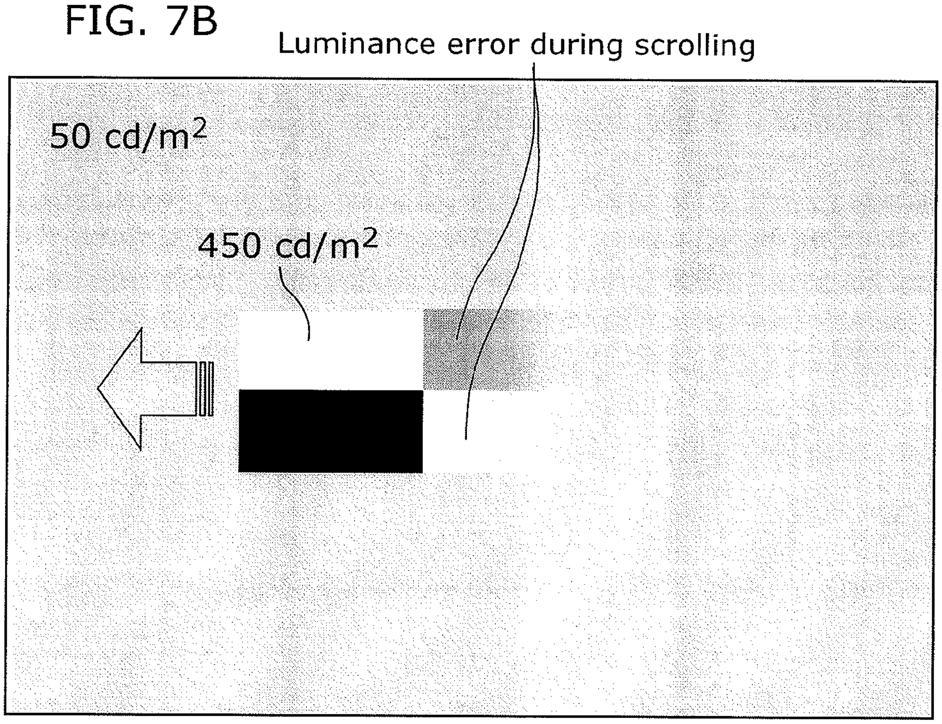
FIG. 7B shows an example of scrolling display by a display unit using a pixel circuit in a comparative example.
Figure 8:
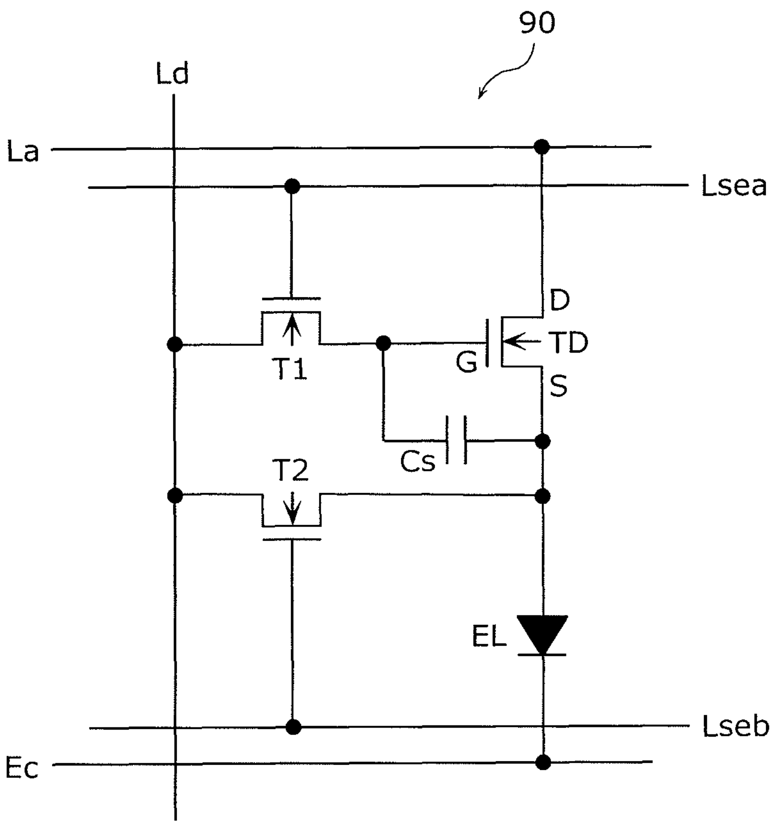
FIG. 8 is a circuit diagram showing an example of a configuration of a conventional pixel circuit.

In the comparative example, non-uniformity of light-emitting luminance was observed for 10 or more frames following the switching to a gray display, depending on whether the display in the preceding frame is white or black. In particular, a big difference was observed in the light-emitting luminance in the first 1 to 2 frames. As a result of this phenomenon, as shown in FIG. 7B for example, when a black or white window is scrolled in an intermediate gray scale background color, it takes a long time for a region that the window passes which once again turns to the background color to settle down to the correct intermediate gray scale luminance, and thus trailing is visible.

From the results of this experiment, it was verified that the introduction of the resetting step remedied the luminance error (trailing) during scrolling display of a window for example. In other words, the introduction of the resetting step improves display quality.

Although the method of driving a display device according to the present invention has been described based on the embodiment, the present invention is not limited to such embodiment. Display devices and methods of driving the same resulting from various modifications of the exemplary embodiment as well arbitrary combinations of constituent components of the exemplary embodiment that may be conceived by those skilled in the art, for as long as these do not depart from the essence of the present invention, are intended to be included within the scope of the present invention.

INDUSTRIAL APPLICABILITY

The present invention is useful in display device using organic EL elements, and is particularly useful in an active-matrix organic EL display device.

REFERENCE SIGNS LIST

1 Display device
2 Display unit
3 Control circuit
4 Scanning line drive circuit
5 Signal line drive circuit
6 Power source circuit
10, 20, 90 Pixel circuit
TD Drive transistor
T1 Switching transistor
Cs Capacitive element
EL Light-emitting element

The invention claimed is:

1. A method of driving a display device, the display device including:

pixel circuits arranged in a matrix; and a power source circuit, each of the pixel circuits including:

a light-emitting element having a first electrode and a second electrode, the second electrode being connected to a second power source line;

a drive transistor having one of a source electrode and a drain electrode connected to a first power source line, and the other of the source electrode and the drain electrode connected to the first electrode of the light-emitting element;

a capacitive element connected to a gate electrode of the driving transistor, for holding a data voltage; and a switching transistor that switches between conduction and non-conduction between the capacitive element and a data line, the power source circuit outputting a voltage to the first power source line and the second power source line, and the method comprising:

a step of simultaneously setting a voltage between both of the electrodes of the light-emitting element of each of the pixel circuits to be smaller than or equal to a threshold voltage of the light-emitting element, by adjusting a voltage outputted by the power source circuit to the first power source line or the second power source line;

a resetting step of simultaneously applying a reset voltage to the gate electrode of the drive transistor of each of the pixel circuits to control fluctuation of a threshold voltage of the drive transistor, the reset voltage being a voltage with which a gate electrode-source electrode voltage of the drive transistor becomes a voltage larger than the threshold voltage of the drive transistor;

a reset-stopping step of applying a voltage that is smaller than the threshold voltage of the drive transistor to the gate electrode of the drive transistor, after the resetting step;

a step of causing the data voltage to be held in the capacitive element, sequentially on a row-by-row basis, after the reset-stopping step, the rows being included in the matrix; and a step of simultaneously causing the light-emitting element of each of the pixel circuits to emit light according to the data voltage, by setting the voltage between both of the electrodes of the light-emitting element to be larger than the threshold voltage of the light-emitting element by adjusting the voltage outputted by the power source circuit to the first power source line or the second power source line.

2. The method according to claim 1, wherein the second electrode of the light-emitting element is connected to the second power source line directly, without interposition of a circuit element, the one of the source electrode and the drain electrode of the drive transistor is connected to the first power source line, without interposition of a circuit element, and the other of the source electrode and the drain electrode of the drive transistor is connected to the first electrode of the light-emitting element, without interposition of a circuit element.

3. The method according to claim 1, wherein each of the pixel circuits does not include any circuit element other than the light-emitting element, the drive transistor, the capacitive element, and the switching transistor.

4. The method according to claim 1, wherein the drive transistor is of a back-channel-etched type or a channel protective film type.

* * * * *